July 17, 1928.
B. G. NICE
1,677,841
METHOD OF MAKING BALL RACE ELEMENTS
Filed Jan. 18, 1923
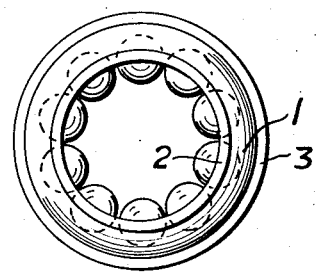
FIG.1.
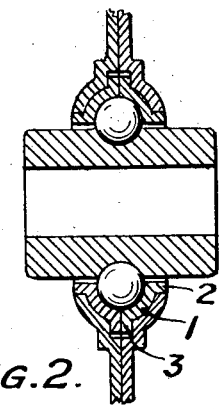
FIG.2.
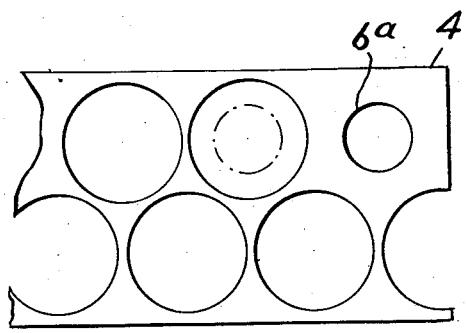
FIG.3.
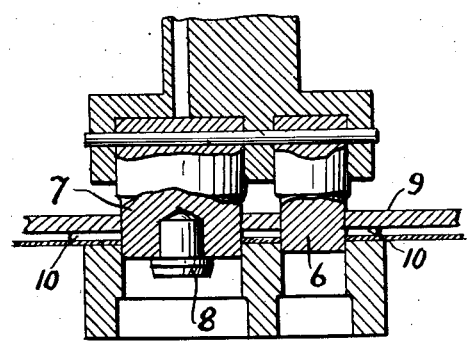
FIG.4.
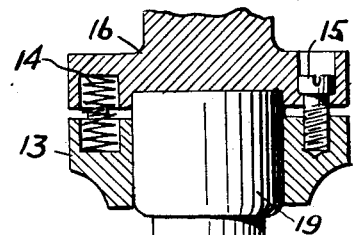
FIG.5.
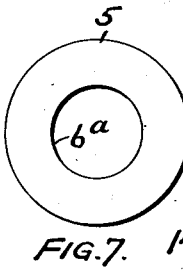
FIG.7.
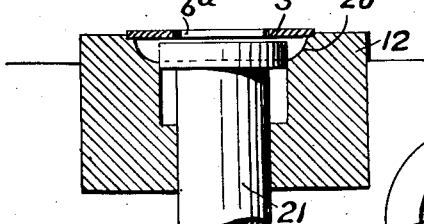
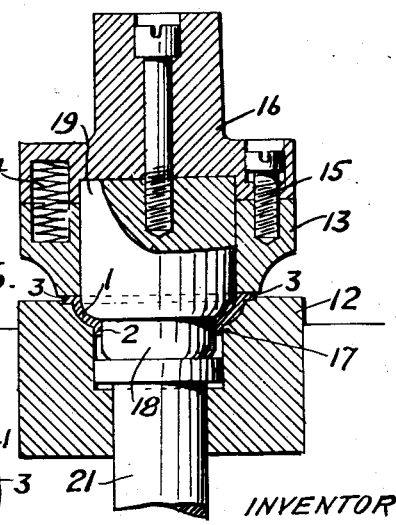
FIG.6.
FIG.8.
WITNESS:
Rob't R. Ketchel.
INVENTOR
Budd G. Nice
BY
Augustus B. Stoughton
ATTORNEY.

Patented July 17, 1928.

1,677,841

UNITED STATES PATENT OFFICE.

BUDD G. NICE, OF OGONTZ, PENNSYLVANIA, ASSIGNOR, BY MESNE ASSIGNMENTS, TO JOHN L. McMICHAEL, TRUSTEE, OF PHILADELPHIA, PENNSYLVANIA.

METHOD OF MAKING BALL-RACE ELEMENTS.

Application filed January 18, 1923. Serial No. 613,488.

The invention will be described in connection with the accompanying drawings forming part hereof and in which Figure 1 is a face view of a ball race element being the product of the method of the present invention.

Fig. 2 is a transverse sectional view showing the ball race element of Fig. 1 in association with other parts of a complete bearing.

Fig. 3 is a view illustrating the manufacture of the metal blanks in the form of flat rings from which the ball race elements are made by the method of the present invention.

Fig. 4 is a sectional elevational view illustrating the manufacture of the metal blanks.

Figs. 5 and 6 are views, principally in central section, illustrating the practice of the method of the invention.

Fig. 7 is a top view of one of the blanks, and

Fig. 8 is a top view of one of the race elements showing how the central opening is enlarged.

The present invention relates to the manufacture of ball race elements of the kind shown in the drawings and which are of the form of a concave or dished disk having at the smaller margin of the concavity 1 an axially arranged tubular neck 2 and having at the larger margin of the concavity a flat radial flange 3.

The principal object of the present invention is to provide a comparatively rapid and inexpensive method for the production of ball race elements of the kind referred to by the employment of comparatively few steps or operations. Another object of the invention is to provide a method for the manufacture of such ball race elements of accurate form, configuration and dimensions. Other objects of the invention will appear from the following description or from it will be obvious to those skilled in the art.

Generally stated, the invention comprises the method of making ball race elements from a metal blank of flat ring form which consists in confining the metal at the rim portion of the blank to its flat form and forcing the metal at the center part of the blank out of the plane of the rim and axially flanging and stretching the rim of the central opening of the blank into the form of a tubular neck and pressing the metal between the neck portion and the flat rim portion into dish form, and shaping the piece to size.

The invention also comprises the improvements in the method of making ball race elements hereinafter described and finally claimed and which improvements are characterized by forcing the metal to flow or change from flat ring form into the form of the ball race element by lateral displacement and by axial displacement of the metal near the center of a ring blank, which displacements may occur simultaneously.

The ball race elements made as described are hardened, for example, by placing them in a revolving gas carburizing furnace or other means and gradually bringing them to the necessary temperature for case hardening and by removing the heated parts from the furnace and quenching them in cold running fresh water and by thereafter sandblasting the parts to remove scale formed on the surface during the heat treatment.

The method of the invention will be described in connection with its practice by means of the apparatus shown on the accompanying drawings and which is an apparatus but not the only apparatus adapted for its practice. A flat metal strip 4 of appropriate thickness and width has cut from it ring blanks 5. For this purpose the strip 4 is run through a punch and die mechanism shown in Fig. 4, for example, from right to left. In operation and at each stroke of the punch and die mechanism the piercing punch 6 and the blanking punch 7 with its pilot pin 8 operate to produce ring blanks 5 and slugs which are the parts removed to form the center openings in the blanks. 9 is a stripper and 10 is an edge guide. The holes 6ª punched by the piercing dies 6 not only provide central openings in the blanks 5 but also in co-operation with the pilot pin 8 insure accuracy in the manufacture of the blanks 5. The metal at the rim portion 3 of the flat ring blank is confined to its flat form as by the die 12 in co-operation with the part 13, which is movably connected as by springs 14 and screws 15 with the other part 16, the parts 13 and 16 making up the complete punch. The metal at the center of the part 2 of the blank is forced laterally out of the plane of the rim 3, and the rim 2 of the central opening of the blank is axially flanged and stretched into the form of a tubular neck, and the metal between the neck and flat rim portions as at 1 is pressed into dish form. Finally the piece is shaped to size. The neck is formed over the shoulder 17 in co-operation with the end 18 of the punch which enters the hole in the center of the blank, and the body 19 of the punch in co-operation with the part 20 of the die is a means for providing the dish or concave form. 21 is a knock-out. From the foregoing description it will be evident that the various steps in the method may be practiced in such close progression that it may be said that they are simultaneous in the sense that the physical changes in the blank can be regarded as occurring at the same time, and when they are made to occur at substantially the same time there is an advantage in that the flat ring blanks are brought to the form of ball race elements at what may be called a single operation because from beginning to end the metal is in a state of being laterally displaced, stretched and re-formed. A comparison of Figs. 7 and 8 shows that the central hole or opening is considerably enlarged whilst the overall dimensions are little changed.

The portion 2 of the blank around the opening is forced laterally out of the plane of the rim into flaring form by pressure applied to that portion in the same direction; otherwise stated, the end of the part 18, being larger than the hole in the blank, applies pressure to the portion of the face of the blank which lies between the rim of the hole and the margin of the blank while the outer part of the blank is confined between the parts 12 and 13, first displacing the blank laterally toward the shoulder 17 and into flaring form enlarging the hole in the blank, and then flanging the neck portion so that the part 18 passes through the hole and holds the neck portion while the part 19 dishes the intermediate part of the blank.

It will be obvious to those skilled in the art to which the invention relates that modifications may be made in details of procedure and in the instrumentalities employed without departing from the spirit of the invention which is not limited as to such matters or otherwise than as the prior art and the appended claim may require.

I claim:

The method of making ball race elements in two stages and at one operation from metal blanks of flat ring form which consists in displacing the inner rim part of the blank laterally out of the plane of the outer rim part and into flaring form and in flanging and stretching the inner rim part of the flaring portion into neck form by pressure applied to the portion of the face of the blank which lies between the rim of the hole and the margin of the blank while the outer part of the blank is confined and while the inner part of the blank is unconfined, and pressing the flaring portion of the blank into dished form by continued application of pressure in the same direction while both the outer part and the neck part are confined.

BUDD G. NICE.